United States Patent [19]

Oberdeck et al.

[11] Patent Number: 4,540,628

[45] Date of Patent: Sep. 10, 1985

[54] HYDROPHILIC SHEET AND METHOD OF MAKING

[75] Inventors: Martin K. Oberdeck, Jacksonville, Fla.; John R. Koza, 2575 Peachtree Rd., NE, #24C, Atlanta, Ga. 30305

[73] Assignee: John R. Koza, Atlanta, Ga.

[21] Appl. No.: 430,242

[22] Filed: Sep. 30, 1982

Related U.S. Application Data

[63] Continuation of Ser. No. 207,882, Nov. 18, 1980, abandoned, which is a continuation of Ser. No. 10,249, Feb. 7, 1979, abandoned.

[51] Int. Cl.$^3$ ........................ B32B 15/08; B32B 27/20

[52] U.S. Cl. ...................................... 428/336; 283/96; 283/97; 283/903; 346/135.1; 427/388.1; 427/397.7; 428/331; 428/199; 428/206; 428/446; 428/450; 428/464

[58] Field of Search ............... 428/464, 199, 206, 532, 428/450, 446, 336, 331; 283/100, DIG. 903, 96, 97; 346/135.1; 427/388.1, 397.7

[56] References Cited

U.S. PATENT DOCUMENTS

| | | | |
|---|---|---|---|
| 2,871,143 | 1/1976 | Getting | 428/464 |
| 3,123,516 | 3/1964 | Eiland | 428/464 |
| 3,138,517 | 6/1974 | Charbonneau | 428/464 |
| 3,574,049 | 4/1971 | Sander | 428/464 |
| 3,840,399 | 10/1974 | Kobayashi | 428/464 |
| 4,106,948 | 8/1978 | Cooper | 428/447 |
| 4,161,968 | 7/1979 | Rasmussen | 428/36 |
| 4,446,174 | 5/1984 | Maekawa | 428/206 |
| 4,460,637 | 7/1984 | Miyamoto | 428/207 |
| 4,478,910 | 10/1984 | Oshima | 428/342 |

FOREIGN PATENT DOCUMENTS

| | | |
|---|---|---|
| 52-53012 | 4/1977 | Japan . |
| 55283 | 4/1983 | Japan . |
| 1426341 | 2/1976 | United Kingdom . |

*Primary Examiner*—Ellis P. Robinson

[57] ABSTRACT

A composite sheet susceptible to having a water base ink applied by an ink jet printing system is provided. The sheet includes a non-absorbent substrate, such as aluminum on to which is applied a coating of hydroxypropyl cellulose dissolved in an organic solvent and containing a suitable flatting agent such as finely divided amorphous silica. The coating is applied in a thickness in the range of 3 to 25 microns. The method of preparing the composite sheet is also disclosed.

4 Claims, 2 Drawing Figures

HYDROPHILIC SHEET AND METHOD OF MAKING

This is a continuation of application Ser. No. 207,882 filed Nov. 18, 1980, now abandoned, which application is a continuation of copending application Ser. No. 010,249 filed Feb. 7, 1979, now abandoned.

This invention relates to a composite sheet having a prepared hydrophilic surface which is susceptible to accepting printing in the form of a water based ink, as well as a method of making the sheet.

Present day printing equipment permits high speed movement of the medium to which the printing is to be applied. In one system a water base ink is applied by a jet type application. Such a system is made and sold by the Mead Corporation of Dayton, Ohio under the name "Dijit". In using such systems the surface to be printed upon is usually absorbent or at least should be hydrophilic. Some non-absorbent surfaces are inherently substantially hydrophobic. Most metals, such as aluminum, and various plastics and coated papers may be so characterized.

It is an object of the present invention to provide a coating for substantially non-absorbent and hydrophobic surfaces which permit the application of water base inks to the surfaces for printing purposes.

It is a further object to provide a coating which is easily applied and will adhere to the surface with sufficient intensity to prevent the coating from flaking off and carrying the applied printing with it.

Still another object is to provide a simple method for preparing such a composite sheet.

BRIEF SUMMARY OF THE INVENTION

By the present invention a flexible sheet suitable for printing is prepared by applying a coating of hydroxypropyl cellulose dissolved in a suitable organic solvent and including a flatting agent, preferably in the form of finely-divided amorphous silica, to the normally non-absorbent surface of the sheet in a thickness in the range of about 3 to 25 microns. The coating is permitted to dry and upon doing so it tenaciously adheres to the non-absorbent surface and creates a hydrophilic coated surface capable of receiving and retaining a water base ink applied by a suitable means, such as an ink jet system.

IN THE DRAWINGS

FIG. 1 is a sectional view showing a composite sheet of the present invention; and FIG. 2 is a schematic view of three stations for carrying out the invention of the present invention.

DESCRIPTION OF THE ILLUSTRATED EMBODIMENTS

Figure 1:
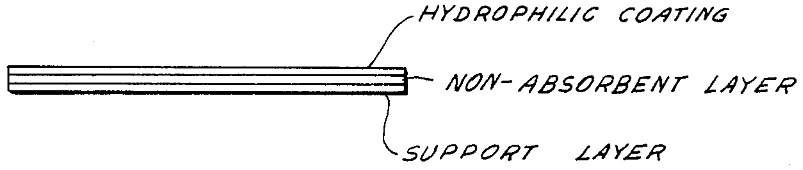
Figure 2:
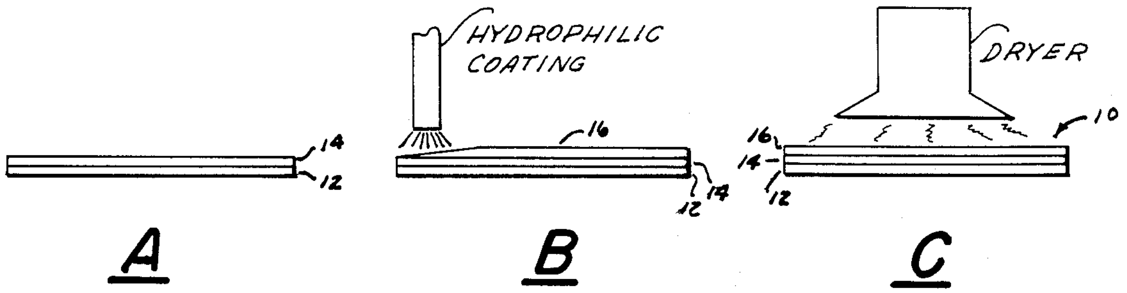

Referring to the drawings and to FIG. 1 in particular, a composite sheet 10 in accordance with the present invention is shown. In this illustration the sheet includes a support layer 12, a non-absorbent layer 14 and a hydrophilic coating 16. It should be understood that the support layer 12 is only shown for the purposes of illustration since the coating 16 may be applied to either a single or a multi-ply sheet.

In the illustrated embodiment the non-absorbent layer is an aluminum foil and the support layer a heavy paper. The hydrophilic coating was made from hydroxypropyl cellulose with a suitable flatting agent made according to the following Example 1 and applied to a thickness of about 3 microns.

EXAMPLE 1

| Ingredient | Percentage By Weight |
|---|---|
| Hydroxypropyl cellulose | 10 |
| Anhydrous ethanol (solvent) | 85 |
| Finely divided amorphous silica gels | 5 |

The hydroxypropyl cellulose used was made by Hercules Corporation and sold under the name "Klucel" and designated standard type L. It had a viscosity in the range of 25–150 determined at 25° C. using a Brookfield LVF.

The anhydrous ethanol used as a solvent was made by and sold under the name "Cellosolve".

The flatting agent in the form of finely divided synthetic amorphous silica gels was made by the Davison division of W. R. Grace & Co. and sold under the name "Syloid" and designated number 244. It had an average micron particle size of 3.3 and a purity of about 99.5 percent $SiO_2$.

The silica acts as a flatting agent and aids the coating to form a film on the non-absorbent layer. It is believed that the silica improves the film hardness helping it to resist abrasion without affecting flexibility. It is also believed that the silica assists in reinforcing the hydroxypropyl cellulose.

To prepare a composite sheet 10 the non-absorbent layer 14 is mechanically cleaned of any foreign materials and then coated by any suitable method such as spraying or roller coating. The coating can also be applied to spot areas by printing using any suitable means such as gravure or silk screen. It is then subjected to a drying action by means of heat until the solvents are driven off and the coating is hard on its outer surface yet securely attached to the layer 14.

Products according to the present invention may be used for any purpose where printing by an ink jet system using water based inks is desired. One product which may be so printed is a lottery ticket having an aluminum foil surface. Such printing is advantageously used for the winning indicia on the ticket which is usually overcoated with a suitable removeable opaque material. The overcoat combines with the aluminum surface to act as a light barrier to protect the security of the ticket. The jet printing permits the indicia to be applied without making a type impression on the sheet. Thus the security of the ticket is further enhanced.

To those skilled in the art obvious alternates to the illustrated and described embodiments will be apparent but still be within the scope of the appended claims.

What is claimed:

1. A composite sheet suitable for printing thereon by an ink jet system and intended for use as a lottery ticket, said sheet having a hydrophilic surface formed on a substrate having a normally non-absorbent surface, said sheet comprising:

an aluminum foil having a non-absorbent surface, and a removable opaque hydrophilic coating on said surface, said coating consisting of hydroxypropyl cellulose and a finely divided amorphous silica as flatting agent.

2. A composite sheet according to claim 1 wherein the coating has a thickness in the range of about 3 to 25 microns.

3. A method of making a composite sheet suitable for printing thereon by an ink jet system and intended for use as a lottery ticket, said method including the steps of applying a coating having a major portion of hydroxypropyl cellulose in an organic solvent and a flatting agent comprising finely divided amorphous silica to a non-absorbent surface of one outer layer of an aluminum sheet, and allowing the solvent to evaporate whereby the hydroxypropyl cellulose and flatting agent coating is hardened and adhered to the non-absorbent surface of the aluminum.

4. A method as defined in claim 3 wherein the coating is applied to a thickness in the range of about 3 to 25 microns.

* * * * *